Nov. 29, 1927. 1,650,756
D. C. KLAUSMEYER
SPRING SUSPENDED SLEEVE
Filed Feb. 17, 1925
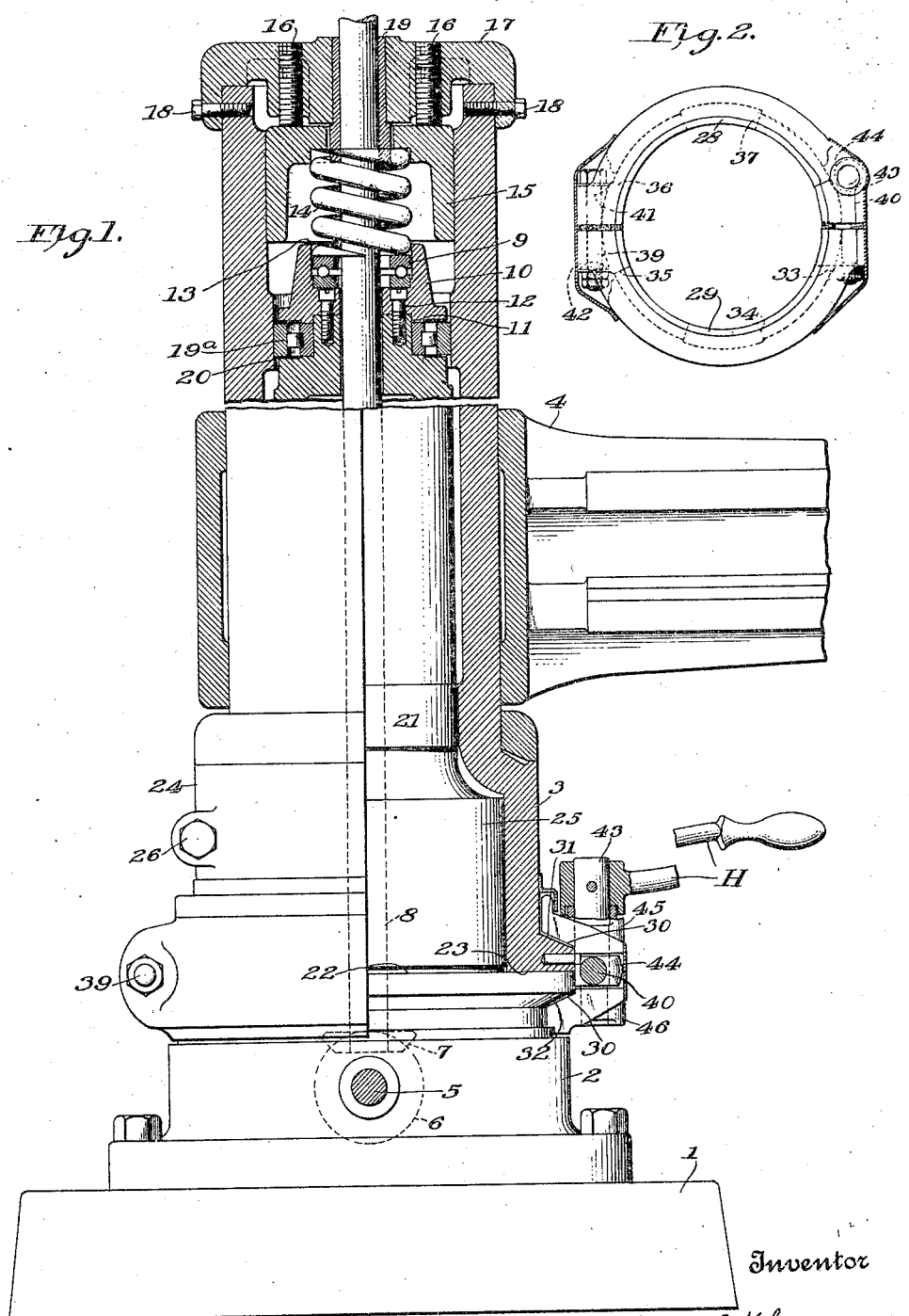
Inventor
David C. Klausmeyer
By Attorney
Albert F. Nathan Patented Nov. 29, 1927.

1,650,756

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

SPRING-SUSPENDED SLEEVE.

Application filed February 17, 1925. Serial No. 9,836.

This invention deals with radial drilling machines and is concerned with the rigid supporting and locking of the radial arm and also with the adjustment of the arm to various operative positions.

In a radial drilling machine, the radial arm, which supports the tool carrying head, is mounted on a sleeve member. The radial arm is adapted to have vertical movement on the sleeve member and the sleeve member is adapted to have rotative movement on a stationary post or column. The radial arm and the tool head carried by it have considerable weight and accordingly exert a force tending to produce friction which interferes with the adjustment or rotation of the sleeve member on the stationary post. Moreover, a force in an opposite direction is exerted by the radial arm on the post when the drill or tool is in operative engagement with the work. The force produced by the engagement between the tool and the work is varied in accordance with the position of the tool head on the radial arm. The force produced by the engagement between the tool and the work is greatly increased when the tool head is positioned near the extreme end of the radial arm.

If the sleeve member is so mounted on the post as to permit free rotative movement, it is apparent more or less clearance must be provided between the post and the sleeve. Such clearance between the sleeve member and the post will produce a deflection of the sleeve when the force produced by the weight of the arm and the tool head is opposed with the force produced by the engagement between the tool and the work. Such deflection interferes with the accuracy and precision of the machine and is very objectionable.

One of the important features of my invention is to provide a supporting mechanism for the sleeve member on the post that shall permit free rotation of the sleeve on the post for the rotative adjustment of the radial arm. The supporting mechanism is so constructed as to permit a rigid securing of the sleeve to the post in such manner as to insure against any deflection during the drilling operation.

In my Patent #1,505,899, dated August 9, 1924, there is disclosed a spring suspension column clamp for supporting the sleeve member of a radial drill and for clamping it to the stationary post or column. My present invention discloses a new mechanism for yieldingly supporting the sleeve member on the post whereby the sleeve member may be adjusted vertically. The mechanism for yieldingly supporting the sleeve member on the post permits a rigidly securing of the sleeve to the post during the drilling operation.

In a radial drill constructed in accordance with my invention the sleeve member is supported on the top of the post by a coil spring member and a spring cap in such manner as to insure an even and reliable support for the sleeve member on an anti-friction bearing carried by the post or column. Moreover the cap member mounted on the spring permits the adjustment of the sleeve member by means of adjusting screws which need not be positioned in a predetermined radial relation with respect to the spring members. Moreover, the spring member does not need to be positioned in a fixed rotative position with respect to the sleeve member.

Other objects and advantages will be in part indicated in the following description and in part rendered apparent therefrom in connection with the annexed drawings.

To enable other skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

In the accompanying drawing, Fig. 1 is a side elevational view, partially in section, of a radial drill embodying my invention, the radial arm being broken off. Fig. 2 is a plan view of the mechanism for clamping the sleeve to the post.

Referring to the drawing, a radial drilling machine is illustrated comprising a base 1 upon which is rigidly secured a post or column 2. A sleeve member 3 is rotatably mounted on the post 2 in a manner to be hereinafter more clearly set forth. The sleeve member 3 carries a radial arm 4 which in turn carries a drill head (not shown).

The radial arm 4 may be adjusted vertically on the sleeve 3 and the drilling tool carried by the drill head may be rotated by any suitable means such as, for example, a power shaft 5 entering the post 2 near its base. The shaft 5 carries a bevel gear wheel 6 which meshes with a bevel gear wheel 7 on a vertical main driving shaft 8. The main driving shaft 8 operates conventional mechanisms for raising and lowering the radial arm 4 and for rotating the drilling tool (not shown). The mechanism for operating the drilling tool and for raising and lowering the arm are well known in the art and accordingly a further description thereof is deemed unnecessary.

An anti-friction bearing 9 is carried by a supporting member 10 on a reduced portion 11 of the post. The supporting member 10 is secured to the post 2 by set screws 12 and is provided with a cup shaped portion 13 within which is mounted the anti-friction bearing 9. A coil spring member 14, which surrounds the main driving shaft 8, is mounted on the anti-friction bearing 9 and is held in position by means of the supporting member 10, as shown in Fig. 1 of the drawing. A spring cap 15, which is mounted on the spring member 14, is positioned inside the sleeve member 3 and is adapted to be engaged by adjusting screws 16 on a sleeve cap 17. The sleeve cap 17 is fixedly secured to the top of the sleeve member 3 by means of bolts 18. A suitable bearing member 19 is provided between the main driving shaft 8 and the caps 17 and 15.

The adjusting screws 16, which engage the spring cap 15, serve to vary the vertical position of the sleeve member 3 on the post or column 2. It will be noted that the set screws 16 do not need to be positioned in any fixed relation with respect either to the spring cap 15 or to the spring member 14. Moreover, the spring member 14 does not need to be set in any fixed radial position with respect to the sleeve member 3.

It will be noted the sleeve member 3 is maintained in coaxial relation with respect to the top of the post by means of an anti-friction bearing 19a. The anti-friction bearing 19a is located between the upper reduced portion 11 of the post and an annular flange 20 formed on the side of the sleeve member 3. The lower end of the sleeve is maintained coaxial with the post by means of a smooth truly cylindrical bearing 21.

As above set forth, one of the main objects of this invention is to provide improved mechanism for bracing the column or post against distortion or deflection when subject to the strains effected during a drilling operation. To this end the post is provided with an annular platform 22 to engage a seat 23 on the lower end of the sleeve member 3. Normally during the adjustment of the radial arm 4 to a drilling position, the weight of the arm, the sleeve and the drill head is mainly carried by the anti-friction bearing 9 on the top of the post 2. The platform 22 on the post 2 should carry very little of the weight of the above mentioned members during the adjusting of the arm to a drilling position.

The lower enlarged portion 24 of the sleeve 3 is preferably split in order to provide means for clamping the sleeve to the cylindrical surface 25 of the post 5 during a drilling operation. A bolt 26 is provided to adjust the tension of the split portion and to permit the ready clamping of the sleeve on the cylindrical portion 25 of the post.

The sleeve member 3 is normally supported on the post 2 to produce no appreciable friction between the sufaces 22 and 23. Prior to the drilling operation, the sleeve 3 is depressed firmly upon the post in opposition to the spring member 14. At this time the surface 23 is moved into engagement with the surface 22. When thus firmly seated upon the annular platform the sleeve becomes not only an auxiliary post but actually becomes virtually a unit of the post 2 and a true reinforcement thereof to effectively resist all strains tending to deflect the column. The means for accomplishing the transfer of weight may consist of a split ring having sections 28 and 29, as shown in Fig. 2 of the drawing. The split ring has an internal V-shaped groove 30 adapted to engage conversely flaring concentric shoulders 31 and 32 provided by the sleeve 3 and the platform 22 respectively. It is important to note the split ring has a two-fold function, to wit, to compel a depression of the sleeve in the vertical direction such that it will be forcibly seated on the face of the platform, and also to accomplish sufficient contraction of the split clamping portion 24 of the sleeve upon the cylindrical surface 25 on the post.

From a structural standpoint the internal V-shaped groove provided by the split ring is discontinuous being composed of sectors 33 to 38 inclusive. This enables the pressures to be exerted radially at diametrically opposite points and insures a uniform action to compensate for any possible irregular deformations of the clamping ring. The two semi-annular portions 28 and 29 are held together by means of two bolts 39 and 40. The head of the bolt 39 preferably has a semi-spherical face 41 seated in a corresponding recess in the section 28 and a similarly formed nut 42 is likewise adjustably arranged at the other end. This construction provides a desirable hinge-like action. The bolt 40 is a part of a clamping device and preferably is in the nature of an eye-bolt; and an eccentric pin 43 passes through the eye 44 of said bolt to enable the ring sections to be drawn together.

The pin 43 is journaled at its upper end to an apertured lug 45 and is likewise journaled at its lower end to a similar lug 46, and this pin may be turned by means of a hand-lever H attached to the pin 43.

With out further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a radial drill, the combination comprising a post; a sleeve member suspended from and rotatable about said post; a main driving shaft located within said post; an anti-friction bearing mounted on the top of said post; a cap secured to the top of said sleeve member; a coil spring surrounding said shaft and located between the said bearing and the cap for supporting the sleeve member on the post; and means for adjusting the vertical position of the sleeve.

2. In a radial drill, the combination comprising a post; a sleeve suspended from and rotatable about said post; an anti-friction bearing mounted on the top of said post; a cap secured to the top of said sleeve member; a coil spring member mounted on said bearing; a spring cap slidingly fitted within said sleeve and mounted on said spring member; and adjusting screws secured to said sleeve cap and engaging the spring cap to vary the vertical position of the sleeve on said post.

3. In a radial drill, the combination comprising a post; a sleeve member suspended from and rotatable about said post; a cap mounted on the top of said sleeve member; a coil spring member and a spring cap positioned between the top of the post and the cap on said sleeve member; means carried by said sleeve cap and engaging said spring cap for adjusting the vertical position of the sleeve member on the post.

4. In a radial drill, the combination comprising a post; a sleeve member surrounding and mounted on said post; an anti-friction bearing mounted on the upper end of said post; a coil spring mounted on said anti-friction bearing; a spring cap mounted on said spring; annular walls provided by said post and cap and engaging said spring to prevent lateral displacement thereof; and means mounted on the sleeve member and engaging the spring cap for varying the vertical position of the sleeve member.

5. In a radial drill, the combination comprising a post; a sleeve member mounted on and surrounding said post; a coil spring member mounted on the top of said post; a spring cap supported on said spring; adjustable means mounted on the sleeve member and engaging the spring cap for varying the position of the sleeve on the post; a platform formed on said post near the lower end thereof and a seat formed on said sleeve member; and means for depressing said sleeve member, in opposition to said coil spring member, to effect engagement between said sleeve and said platform.

In witness whereof, I have hereunto subscribed my name.

DAVID C. KLAUSMEYER.